E. O. CUSTER.
EXPANSIBLE PULLEY.
APPLICATION FILED JAN. 23, 1914.

1,144,353.

Patented June 29, 1915.

Witnesses
Eric G. Flannagan
U. B. Hillyard.

Inventor
Ernest O. Custer
By Victor J. Evans
Attorney

UNITED STATES PATENT OFFICE.

ERNEST O. CUSTER, OF WEST NEW YORK, NEW JERSEY.

EXPANSIBLE PULLEY.

1,144,353.  Specification of Letters Patent.  Patented June 29, 1915.

Application filed January 23, 1914. Serial No. 813,972.

*To all whom it may concern:*

Be it known that I, ERNEST O. CUSTER, a citizen of Switzerland, residing at West New York, in the county of Hudson and State of New Jersey, have invented new and useful Improvements in Expansible Pulleys, of which the following is a specification.

The invention relates to pulleys of the type capable of being expanded or contracted so as to meet varying conditions as to speed or other purpose for which such pulleys are provided in the mechanic arts.

In accordance with this invention the pulley comprises a hub having radial arms or spokes, rim sections having stems movably mounted in the spokes, expansible springs arranged between the rim sections to provide supporting means between such sections, and means for moving the rim sections to cause expansion or contraction of the pulley as required, such means consisting of toothed nuts mounted upon the spokes of the pulley and engaging threads of the rim section stems, and a master wheel for rotating the series of nuts to cause like movement of the rim sections of the pulley so as to preserve the circular outline of such pulley at all stages of its adjustment.

The invention consists of the novel features, details of construction and combination of parts, which hereinafter will be more particularly set forth, illustrated in the accompanying drawing, and pointed out in the appended claims.

Figure 1:
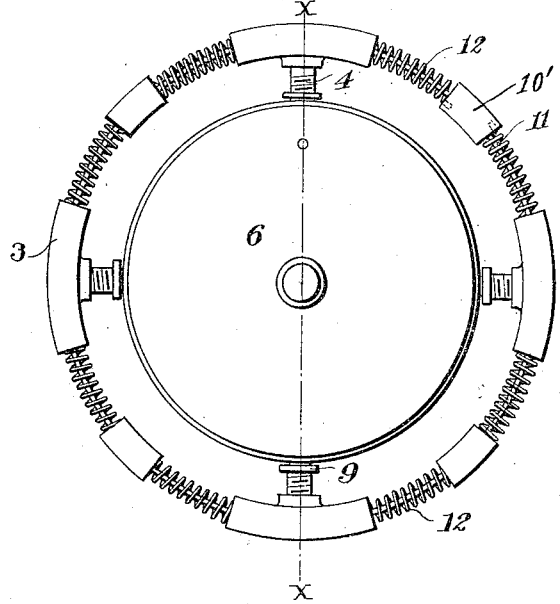
Figure 2:
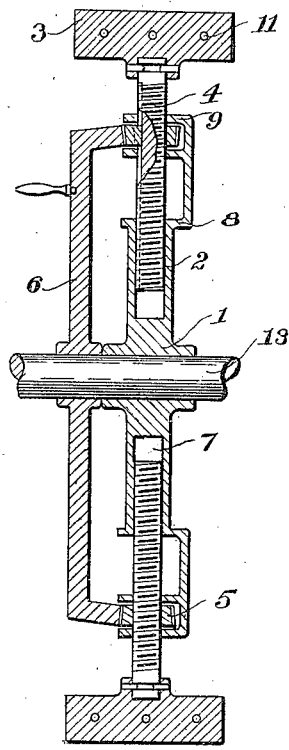
Figure 4:
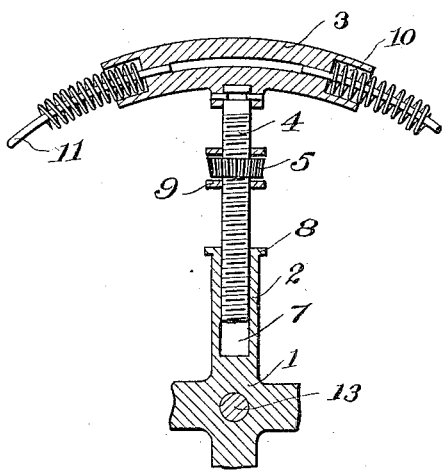
Figure 3:
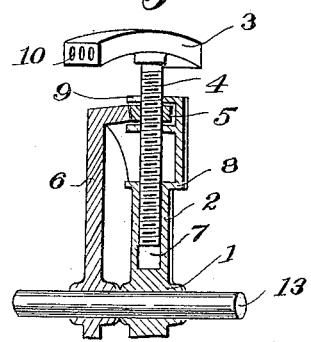

Referring to the drawing, forming a part of the specification, Figure 1 is a side view of an expansible pulley embodying the invention. Fig. 2 is an enlarged section on the line x—x of Fig. 1. Fig. 3 is a detail perspective view of a part of the pulley. Fig. 4 is a sectional detail.

Corresponding and like parts are referred to in the following description, and indicated in all the views of the drawing, by the same reference characters.

The pulley comprises a hub 1, radial spokes or arms 2, rim sections 3 having threaded stems, 4, nuts 5 mounted upon the threaded stems 4, and a master wheel 6 for operating the nuts 5 to effect a like movement of the rim sections when expanding or contracting the pulley so as to preserve its circular contour at all adjustments. Each spoke or arm 2 has an opening 7 to receive the inner end of the stem of a rim section and is formed with an offset extension 8 provided at its outer end with spaced lateral extensions or lugs 9, which are apertured in line with the opening 7 so as to receive the threaded stem 4 of a rim section. Each of the nuts 5 is arranged between the lateral extensions or lugs 9 and is mounted upon the threaded stem 4 of the rim section passing through such lateral extensions or lugs. The nuts 5 are toothed at their outer edges and are in mesh with the toothed portion of the master wheel 6, which latter is rotatable with reference to the pulley to admit of expanding or contracting the same by rotating the wheel 6. The hub 1 is secured to a shaft 13 whereas the master wheel 6 is loose upon such shaft.

Openings 10 are formed in the end portions of the rim sections and are curved to form to the curvature of such sections 3. Curved rods 11 span the joints formed between adjacent rim sections, opposite end portions of such rods entering the openings 10. Segmental blocks 10' which form the rim of the wheel are spaced apart by means of the curved rods 11. Helical springs 12 of expansible type are mounted upon the curved rods 11 and have end portions entering the openings 10, such helical springs being stiffened and strengthened by means of the curved rods 11 so as to support the drive belt or like part opposite the spaces between the extremities of adjacent rim sections of the pulley. It is to be understood that the number of rods 11 and springs 12 will depend upon the width of the pulley and the width of the drive belt, apron or like part to be supported by means of the pulley.

When the pulley is adjusted to bring the extremities of the rim sections together it is of minimum diameter. When it is required to increase the diameter of the pulley the master wheel 6 is turned to operate the nuts 5 in a manner to cause outward movement of the rim sections, with the result that the spaces between the extremities of such rim sections increase, such spaces being spanned by means of the rods 11 and springs 12 so as to provide a practically continuous peripheral surface for supporting the part to be sustained by means of the pulley.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new is:

1. An expansible pulley comprising relatively movable rim sections having openings formed therein, curved rods having their end portions inserted in the openings of the rim sections, and expansible helical springs embracing such rods with their end portions entering the openings of the rim sections, said rods and springs spanning the spaces formed between the rim sections when the pulley is expanded.

2. An expansible pulley comprising relatively movable spaced rim sections having openings formed in the opposite ends thereof, curved rods mounted in the spaces between adjacent rim sections and having their end portions inserted in the openings of said rim sections, and expansible helical springs embracing such rods with their end portions entering the openings of the rim sections, said rods and springs spanning the spaces formed between the rim sections when the pulley is expanded.

3. An expansible pulley comprising relatively movable spaced rim sections having openings formed in the opposite ends thereof, curved rods mounted in the spaces between adjacent rim sections and having their end portions inserted in the openings of said rim sections, and expansible helical springs embracing such rods with their end portions entering the openings of the rim sections, said rods and springs spanning the spaces formed between the rim sections when the pulley is expanded, said rods serving as reinforcements in said springs.

In testimony whereof I affix my signature in presence of two witnesses.

ERNEST O. CUSTER.

Witnesses:
JOHN A. DONEGAN,
GEO. A. BYRNE.

Copies of this patent may be obtained for five cents each, by addressing the "Commissioner of Patents, Washington, D. C."